United States Patent
Matthias et al.

(10) Patent No.: US 11,660,755 B2
(45) Date of Patent: May 30, 2023

(54) APPARATUS AND METHOD FOR MONITORING A WORKING ENVIRONMENT

(71) Applicant: Siemens Aktiengesellschaft, Munich (DE)

(72) Inventors: Frank Matthias, Erlangen (DE); Reiner Heilmann, Egmating (DE); Minh Le, Erlangen (DE); Alexander Stein, Veitsbronn (DE); Maximilian Walter, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 269 days.

(21) Appl. No.: 17/070,745

(22) Filed: Oct. 14, 2020

(65) Prior Publication Data

US 2021/0107158 A1 Apr. 15, 2021

(30) Foreign Application Priority Data

Oct. 15, 2019 (EP) ..................................... 19203304

(51) Int. Cl.
*B25J 9/16* (2006.01)

(52) U.S. Cl.
CPC .................................. *B25J 9/1676* (2013.01)

(58) Field of Classification Search
CPC ...... B25J 9/1664; B25J 9/1666; B25J 9/1676; G05B 2219/40202; G05B 2219/40472;
(Continued)

(56) References Cited

U.S. PATENT DOCUMENTS

| | | |
|---|---|---|
| 2012/0265342 A1 | 10/2012 | Kumiya et al. |
| 2013/0120253 A1 | 5/2013 | Hamm |
| 2016/0277887 A1 | 9/2016 | Grohmann |
| 2017/0199299 A1 | 7/2017 | Braune |
| 2018/0144459 A1 | 5/2018 | Hamadou et al. |

(Continued)

FOREIGN PATENT DOCUMENTS

| | | |
|---|---|---|
| CN | 102744727 | 10/2012 |
| EP | 2594373 | 5/2013 |

(Continued)

OTHER PUBLICATIONS

T.M. Chan et al. "Optimal output-sensitive convex hull algorithm in two and three dimensions, Discrete and Computational Geometry", 16, 1996, pp. 361-368; 1996.

(Continued)

*Primary Examiner* — Spencer D Patton
(74) *Attorney, Agent, or Firm* — Cozen O'Connor

(57) ABSTRACT

A method for monitoring a working environment of a movable device utilizing a monitoring apparatus, wherein the working environment includes a working area and at least one protected area and the movable device is located within the working area during normal operation of said movable device, where the method includes a user inputting a plurality of convex polytopes into the monitoring apparatus, the convex polytopes corresponding to areas in which the movable device is located during normal operation, determining a convex polytope hull using the monitoring apparatus, the convex polytope hull completely enclosing the multiplicity of convex polytopes, and determining the at least one protected area by calculating a difference from the convex polytope hull and the input using the monitoring apparatus, such that monitoring of the position of the movable device is simplified because the working area can be modeled autonomously.

11 Claims, 4 Drawing Sheets

(58) Field of Classification Search
CPC ........... G05B 2219/40478; G05B 2219/40438; G05B 2219/40446
See application file for complete search history.

(56) References Cited

U.S. PATENT DOCUMENTS

2018/0144503 A1    5/2018   Hamadou et al.
2019/0039242 A1*   2/2019   Fujii ..................... G05B 19/19

FOREIGN PATENT DOCUMENTS

| EP | 3189947 | 7/2017 |
| EP | 3323565 | 5/2018 |
| EP | 3324362 | 5/2018 |
| JP | S642893 | 1/1989 |
| WO | WO 2018/041743 | 3/2018 |

OTHER PUBLICATIONS

C. Bradford Barber et al. "The quickhull algorithm for convex hulls", ACM Transactions on Mathematical Software (TOMS), vol. 22, Issue 4, Dec. 1996, pp. 469-483; 1996.
Real-Time Collision Detection (Christer Ericson, Morgan Kaufmann, 2005), ISBN: 1-55860-732-3; 2005.
Landier, Sâm, "Boolean Operations on Arbitrary Polyhedral Meshes", Procedia Engineering, vol. 124 issue (24th International Meshing Roundtable), 2015, pp. 200-212, Elsevier; 2015.
EP Search Report dated May 4, 2020 based on EP19203304 filed Oct. 15, 2019.

\* cited by examiner

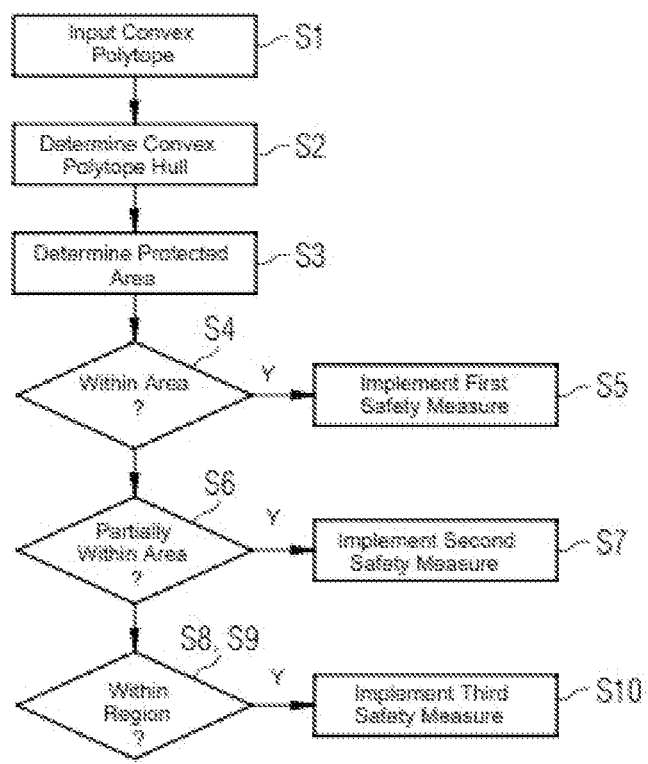
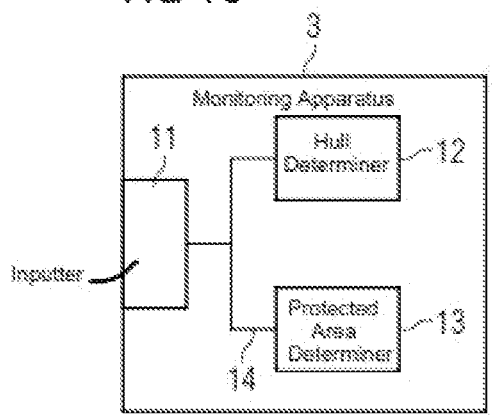

APPARATUS AND METHOD FOR MONITORING A WORKING ENVIRONMENT

BACKGROUND OF THE INVENTION

1. Field of the Invention

The present invention relates to a monitoring apparatus and method for monitoring a working environment of a movable device using a monitoring apparatus.

2. Description of the Related Art

In industrial environments, movements of a movable device, such as an industrial robot, are often monitored. This involves, for example, preventing the industrial robot from leaving a prescribed working area in order to thus prevent accidents. In order to autonomously monitor a working environment comprising the working area, it is particularly important for the working area to be modeled correctly. There is a need to enable correct modeling in an autonomous manner.

SUMMARY OF THE INVENTION

With the foregoing in mind, it is an object of the present invention to provide an improved apparatus and method for monitoring a working environment of a movable device using a monitoring apparatus.

This and other objects and advantages are achieved in accordance with the invention by a method for monitoring a working environment of a movable device using a monitoring apparatus, where the working environment comprises a working area and at least one protected area, and where the movable device is located in the working area during normal operation of said movable device. The method comprises inputting, by a user inputting a plurality of convex polytopes into the monitoring apparatus, where the convex polytopes correspond to areas in which the movable device is located during normal operation, determining a convex polytope hull using the monitoring apparatus, where the convex polytope hull completely encloses the multiplicity of convex polytopes, and determining the at least one protected area by calculating a difference from the convex polytope hull and the input using the monitoring apparatus.

Based on the described method in accordance with the invention, a polytope hull and at least one protected area of the working environment to be monitored can be determined autonomously. Autonomously particularly means, in this case, monitored by the monitoring apparatus and not by a person. By virtue of this autonomous determination of the two parameters by the monitoring apparatus, configuration of the monitoring apparatus used for monitoring can be simplified, because the user is not required to manually determine the polytope hull or the protected area or input them into the monitoring apparatus. Modeling of the working environment is particularly simplified. As a result, the monitoring procedure is can be simplified. The described method in accordance with the invention additionally allows a more flexible use of the monitoring apparatus used for monitoring, because this is able to redetermine the polytope hull and the at least one protected area with little effort in the event of changes in the user input.

The movable device is in particular a device that has at least one movable part. The movable device is, for example, a machine having one or more movable axles, a robot, a crane and/or a vehicle. The movable device is particularly used in an industrial environment. The movable device may also be referred to as kinematics.

When the movable device is operating correctly, i.e., during normal operation, it particularly restricts its movements to the working area. If the movable device at least partly leaves the working area, then incorrect behavior of the movable device may, for example, be assumed.

The working environment is particularly an area that is can be monitored by the monitoring apparatus, such as based on sensors. The working environment may comprise the working area and protected areas.

In order to initiate monitoring of the working environment by the monitoring apparatus, the user of the movable device may perform an input into the monitoring apparatus. For this purpose, the user may, for example, use an interface of the monitoring apparatus. The input may be performed via a graphical interface of the monitoring apparatus. It is also possible to input or to send a CAD document to the monitoring apparatus as input.

The input particularly comprises a multiplicity of convex polytopes. The individual convex polytopes may specify areas in which the movable device is allowed to move during normal operation. The convex polytopes of the input may overlap. The entirety of the convex polytopes in particular overall forms the working area.

A polytope is particularly understood to mean a generalized polygon of any dimension. The polytopes are preferably two-dimensional or three-dimensional polygons. Here, convex means that all of the internal angles of the polytopes are less than 180°.

The entirety of the convex polytopes particularly corresponds to a non-convex concave working area. In particular, it is presently not efficiently possible to check whether a polytope is located completely in a working area when this working area is a concave polytope. Specifically, for this reason, it is important to determine the polytope hull and the protected area(s), because polytope hulls and protected areas are convex polytopes that are efficiently able to be checked for being left or for overlaps.

The monitoring apparatus may be a computing unit, such as a processor of a computer. The monitoring apparatus may also form part of an industrial PC or part of a programmable logic controller (PLC).

The monitoring apparatus may be suitable for autonomously determining the polytope hull based on the user input. The polytope hull may be considered to be the smallest convex polytope that contains all of the convex polytopes of the input. The polytope hull may enclose or surround the convex polytopes. Here, the polytope hull particularly extends along the convex regions of the working area and extends these, by the protected areas, into the concave regions of the working area. There may, however, also be a greater distance between the polytope hull and the working area.

The convex polytope hull may correspond to the sum of the working area and the protected areas. In order to determine the polytope hull, the monitoring apparatus may for example use the algorithms from the articles "Optimal output-sensitive convex hull algorithm in two and three dimensions" (T. M. Chan et al., Discrete and Computational Geometry, 16, 1996, pages 361-368) or "The quickhull algorithm for convex hulls" (C. Bradford Barber et al., ACM Transactions on Mathematical Software (TOMS), Volume 22, Issue 4, December 1996, pages 469-483). In special cases, such as when all of the areas are cuboids aligned with the axes, the hull may also easily be determined by increasing the length of an area. Other known algorithms for determining the polytope hull may however also be applied.

The determined polytope hull may be used by the monitoring apparatus to autonomously determine the at least one protected area. To this end, the monitoring apparatus may calculate the difference from the polytope hull and the convex polytopes of the input. In particular, the protected areas are areas of the working environment that do not belong to the working area but do belong to the polytope hull. The difference may be calculated based on the algorithms that are described in the article "Boolean Operations on Arbitrary Polyhedral Meshes" (Sam Landier, Computer-Aided Design, Elsevier, 2016, pages 1-35, 10.1016/j.cad.2016.07.013, hal-01394537). In special cases, such as when all of the areas are cuboids aligned with the axes, the calculation of the difference may be greatly simplified. Other known algorithms for calculating the difference may also be used, however.

By virtue of determining the polytope hull and the protected area(s), it is possible in particular to completely characterize the working area. Departure from the working area is in this case in particular not checked directly, but rather the working area can be monitored just as well as in the case of direct determination by using the determined polytope hull and protected area(s). Monitoring of concave working areas is thus able to be simplified, since it is able to be configured autonomously.

IN accordance with one embodiment, the method furthermore comprises determining whether the movable device is located completely within the determined polytope hull and only if it is determined that the movable device is not located completely within the determined polytope hull, performing a first safety measure.

In the context of the monitoring, the monitoring apparatus may determine whether the movable device is located within the determined polytope hull. Here, it is in particular determined whether the movable device is located completely in the polytope hull. In order to determine the position of the movable device with respect to the polytope hull, various sensors of the monitoring apparatus and/or of the movable device may be used. The movable device (in particular its movable parts) may be equipped with a position sensor that, for example, tracks a GPS position of the parts. A further option for determining the position is to record all of the axle positions of multi-axle kinematics (e.g., industrial robot) and to subsequently determine all of the movable parts through forward transformation. The monitoring apparatus may also monitor the position of the movable device using a camera and thus determine whether the movable device is or is not completely contained in the polytope hull.

If the monitoring apparatus determines that the movable device has at least partly left the polytope hull, then this indicates, for example, a malfunction of the movable device and/or a risk. Here, the monitoring apparatus may perform a first safety measure to guarantee the safety of the movable device and its environment. Examples of the first safety measure are explained in even more detail below.

In accordance with a further embodiment, the method furthermore comprises determining whether the movable device is located at least partly within the at least one determined protected area and only if it is determined that the movable device is located at least partly within the at least one determined protected area, performing a second safety measure.

In the context of the monitoring, the monitoring apparatus may determine whether the movable device is located fully or partly within the determined protected area(s). In order to determine the position of the movable device with respect to the at least one protected area, the various sensors that have already been described above of the monitoring apparatus and/or of the movable device may be used. In order to check whether the movable device at least partly overlaps one of the protected areas, the monitoring apparatus may, for example, use functions for checking convex polytopes in pairs, as are described for example in "Real-Time Collision Detection" (Christer Ericson, Morgan Kaufmann, 2005).

If the monitoring apparatus determines that the movable device is at least partly in a protected area, then this indicates, for example, a malfunction of the movable device and/or a risk. Here, the monitoring apparatus may perform a second safety measure in order to guarantee the safety of the movable device and its environment. Examples of the second safety measure are described in even more detail below.

In accordance with a further embodiment, the convex polytope hull completely encloses the multiplicity of convex polytopes, such that a volume of the convex polytope hull is minimal. This means, for example, that the convex polytope hull is the smallest geometric shape that encloses all of the convex polytopes and is at the same time convex.

In accordance with a further embodiment, the movable device is a robot in an industrial installation. This robot is used, for example, in product manufacture.

IN accordance with a further embodiment, at least one of the convex polytopes input by the user corresponds to a transfer region that allows a transfer of manufactured products between an inner region of the working area and an outer region of the working area.

The transfer region may be a region in which the movable device (in particular a movable robot arm) forwards a manufactured product or a component part to a next movable device or to a user. The transfer region may also be a region in which a user or another external device specifies something to the movable device. In other words, the transfer region is in particular an interaction region between the movable device and the "outside world" outside the working area.

Such transfer regions are often externally protruding projections from the working area that lead to the working area having a concave shape. The method in accordance with disclosed embodiments of the invention is particularly advantageous for working areas having transfer regions.

When inputting the convex polytopes, the user may specify that one or more of the polytopes are transfer regions. The computing unit may store this information and take it into account when monitoring the working environment.

In accordance with a further embodiment, the method furthermore comprises determining whether a user and/or an external device is intervening in the transfer region from outside the working area, determining whether the movable device is located at least partly within the transfer region, and only if it is determined that a user and/or an external device is intervening in the transfer region from outside the working area and that the movable device is located at least partly within the transfer region, performing a third safety measure.

In the context of the monitoring, the monitoring apparatus may determine whether the movable device is located partly or fully within the transfer region. The computing unit may furthermore determine whether a further external object, such as the external device or the user, is located partly in the transfer region.

In order to determine the position of the movable device and the external object, the sensors already described above may be used. If the monitoring apparatus determines that the movable device is at least partly in the transfer region while an external object is also in the transfer region, then this indicates, for example, a malfunction of the movable device and/or a risk. Here the monitoring apparatus may perform a third safety measure in order to guarantee the safety of the movable device and its environment. Examples of the third safety measure are explained in even more detail below.

In accordance with a further embodiment, the first, second and/or third safety measure comprises deactivating the movable device, outputting a visual alarm and/or outputting an alarm sound.

By deactivating the movable device, it is possible to prevent the movable device from injuring a user outside the working area, from striking obstacles outside the working area, or the like. By outputting an alarm, the user can be made aware of incorrect behavior of the movable device and/or of a hazard. The visual alarm and/or the alarm sound may furthermore characterize the detected hazard or the detected fault, so that the user is able to intervene correctly.

In accordance with a further embodiment, the working area has a concave shape.

It is also an object of the invention to provide a monitoring apparatus for monitoring a working environment of a movable device, where the working environment comprises a working area and at least one protected area, and wherein the movable device is configured so as to be located in the working area during normal operation of said movable device. The monitoring apparatus comprises an input unit for a user to input a multiplicity of convex polytopes, where the convex polytopes correspond to areas in which the movable device is located during normal operation, a hull determination unit for determining a convex polytope hull, where the convex polytope hull completely encloses the multiplicity of convex polytopes, and a protected area determination unit for determining the at least one protected area by calculating a difference from the convex polytope hull and the input.

The embodiments and features described for the disclosed embodiments of the method in accordance with the invention accordingly apply to the monitoring apparatus in accordance with the invention. The monitoring apparatus in accordance with disclosed embodiments of the invention is particularly suitable for performing the method in accordance with disclosed embodiments of the invention.

The respective unit, for example, input unit, hull determination unit or protected area determination unit, may be implemented as hardware and/or as software. In the case of an implementation in the form of hardware, the respective unit may be configured as a device or as part of a device, such as a computer or as a microprocessor or as a control computer of a vehicle. In the case of an implementation in the form of software, the respective unit may be configured as a computer program product, as a function, as a routine, as part of a program code or as an executable object.

It is also and object of the invention to provide a computer program product that prompts the performance of the above-described disclosed embodiments of the method in accordance with the invention or in accordance one embodiment of the method implemented on a program-controlled apparatus.

A computer program product, such as a computer program means, may be provided or supplied, for example, as a storage medium, such as a memory card, USB stick, CD-ROM, DVD, or in the form of a file downloadable from a server in a network. This may be performed for example in a wireless communication network by transmitting a corresponding file containing the computer program product or the computer program means.

Further possible implementations of the invention also comprise combinations that are not explicitly mentioned of features or embodiments that are described above or below with respect to the exemplary embodiments. In this case, a person skilled in the art will also add individual aspects to the respective basic form of the invention as improvements or additions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below on the basis of preferred embodiments with reference to the appended figures, in which:

FIG. 9 shows an alternative embodiment of a method for monitoring a working environment in accordance with the invention; and FIG. 10 shows an embodiment of a monitoring apparatus in accordance with the invention.

DETAILED DESCRIPTION OF THE EXEMPLARY EMBODIMENTS

Identical or functionally identical elements have been provided with the same reference signs in the figures, unless indicated otherwise. FIGS. 2, 3, 6, 7 and 8 illustrate the polytopes as two-dimensional shapes, for purposes of simplicity of illustration. The shapes are however generally three-dimensional polytopes. Two-dimensional polytopes (polygons) are however also not excluded.

Figure 1:
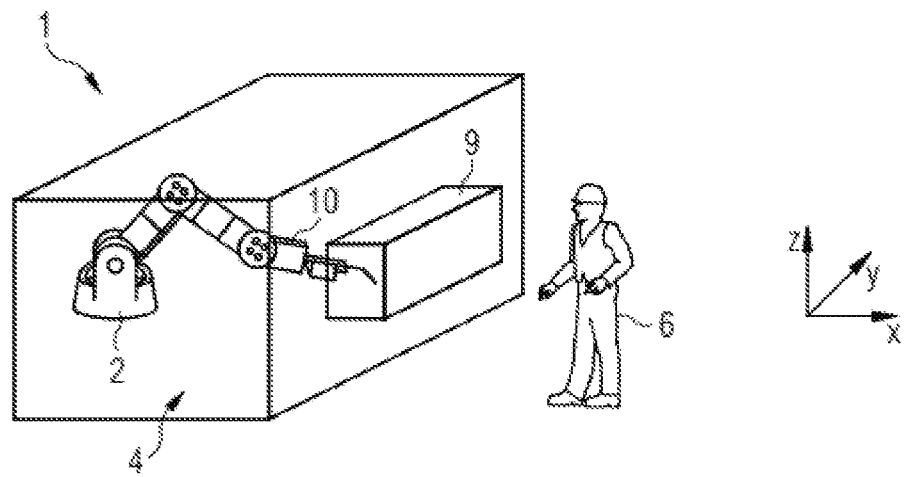
FIG. 1 shows an exemplary movable device in a working environment in accordance with the invention.

FIG. 1 shows an example of a movable device 2 in a working environment 1. The movable device 2 is an industrial robot that is used in the manufacture of products, such as automobiles. The robot 2 comprises a robot arm 10 that is movable in order to move parts that are to be processed during manufacture.

The movement of the robot arm 10 and thus of the robot 2 is restricted to a working area 4 of the working environment 1 during normal operation. This means that the robot 2 leaves the working area 4 fully or partly only in the event of incorrect behavior.

The working area 4 is formed from two cuboids: a large cuboid and a small cuboid 9 in front of it and forming a transfer region. The transfer region 9 is used to output products processed by the robot 2 to a user 6. Here, the transfer region 9 is the only interface between an interior of the working area 4 and an exterior of the working area 4.

In order to ensure that the robot 2 is operating as intended, without injuring the user 6 and without destroying the environment outside the working area 4, it is important to check whether the robot 2 actually remains completely in the working area 4.

Figure 2:
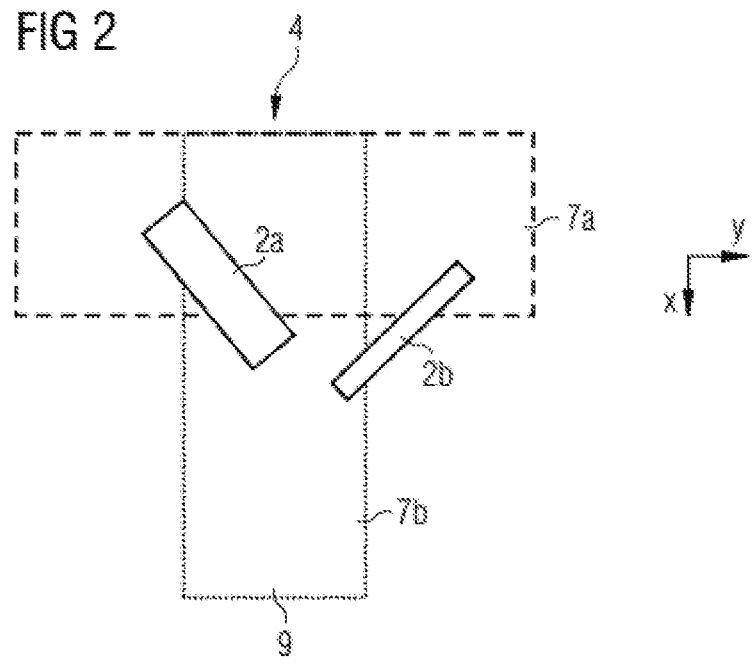
FIG. 2 shows a convention modeling of a working area.

In order to perform monitoring using a monitoring apparatus, the working area 4 must initially be modeled. FIG. 2 shows conventional modeling of such a working area 4.

As illustrated in FIG. 2, the working area 4 is modeled by two polytopes (cuboids) 7a, 7b in this conventional modeling, where that part of the cuboid 7b not overlapping the cuboid 7a is intended to model the monitoring region 9. Whether each movable device (robot) 2a, 2b is located in the first cuboid 7a or in the second cuboid 7b is then monitored. The modeling and check according to FIG. 2 has a number of disadvantages, however.

The robot 2a is in fact located partly outside the cuboid 7a and partly outside the cuboid 7b, but completely within the working area 4. Nevertheless, the monitoring apparatus would, in such a case incorrectly identify incorrect behavior of the robot 2a.

In the case of a check as to whether all of the corners of the robot 2a, 2b are located in the cuboids 7a, 7b as well, the monitoring would be unreliable. Although all of the corners of the robot 2b are in fact located in the cuboids 7a, 7b, the robot 2b is not completely in the working area 4. This would not be detected in the context of the check according to FIG. 2.

The conventional modeling from FIG. 2 is therefore incorrect from a mathematical point of view.

Figure 3:
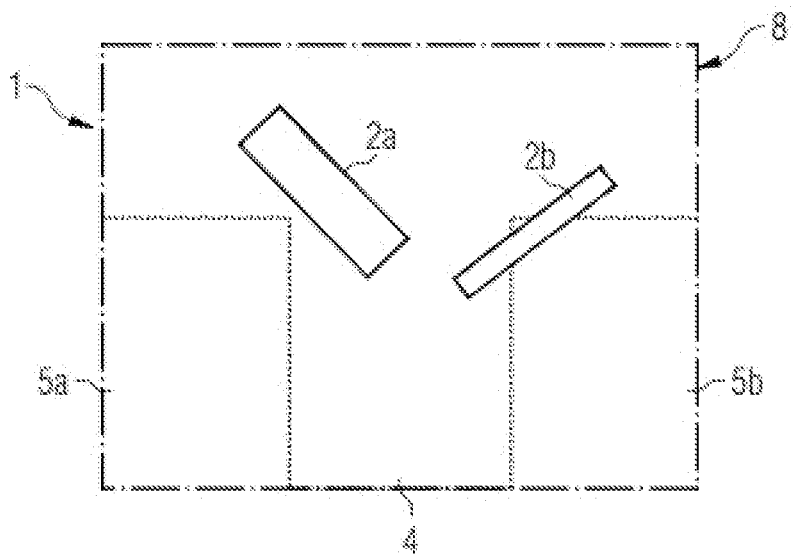
FIG. 3 shows an exemplary mathematically correct modeling of a working area in accordance with the invention.

FIG. 3 shows mathematically correct modeling of a working area 4. Here, the working area 4 is calculated from a difference between a polytope hull 8 that completely encloses the actual working area 4 and protected areas 5a, 5b. In contrast to FIG. 2, the working area is defined not by combining bodies 7a, 7b, but rather by calculating a difference.

Figure 4:
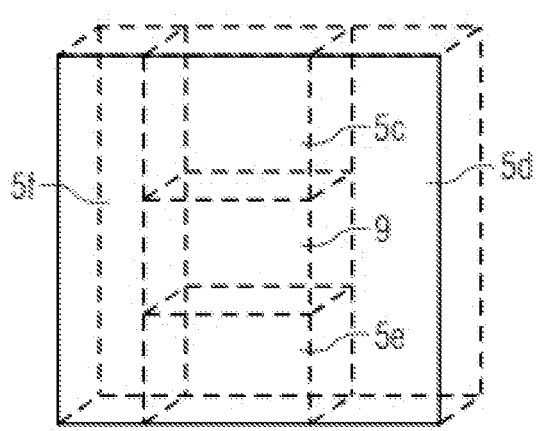
FIG. 4 shows an exemplary of mathematically correct modeling of a transfer region in accordance with the invention.

Manual determination and input of the protected areas 5a, 5b is complex, cognitively challenging and therefore susceptible to errors, in particular when modeling the protruding transfer region 9. This is illustrated for example in FIG. 4, in which four protected areas 5c, 5d, 5e, 5f are necessary to define the transfer region 9.

Figure 5:
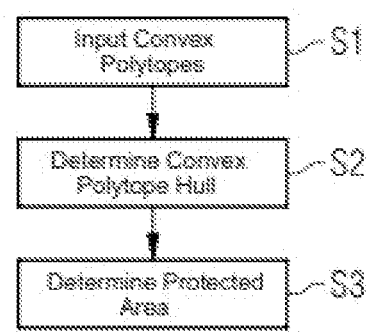
FIG. 5 shows an embodiment of a method for monitoring a working environment in according with the invention.

FIG. 5 shows a method for monitoring a working environment 1 in accordance with a first embodiment. The method of FIG. 5 is used to autonomously achieve the mathematically correct model of the working area 4 in accordance with FIG. 3. The illustrated method is performed using a monitoring apparatus 3 that is illustrated in FIG. 10 and comprises an input unit 11, a hull determination unit 12 and a protected area determination unit 13 that are connected to one another by an internal bus 14.

In a step S1 (FIG. 5), a plurality of convex polytopes 7c, 7d, 7e are input into the input unit 11 of the monitoring apparatus 3 by the user 6. Here, the input unit 11 is a graphical interface of the monitoring apparatus 3 via which the user 6 can draw the polytopes 7c-7e.

Figure 8:
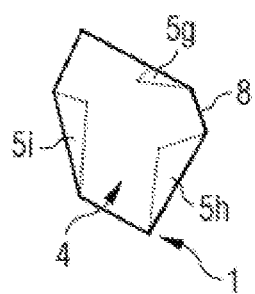
FIG. 8 shows an exemplary of a determined working environment in accordance with the invention.

One example of such a user input is shown in FIG. 8. The input in FIG. 8 contains three polytopes 7c, 7d, 7e that each have a convex shape. There is an overlap between the polytopes 7c, 7d, 7e. Together, the polytopes 7c, 7d, 7e form the overall working area 4. This means that the polytopes 7c, 7d, 7e correspond to the areas in which the robot 2 is located during normal operation. Here, the polytope 7c forms a transfer region 9 within the above-described meaning.

Figure 6:
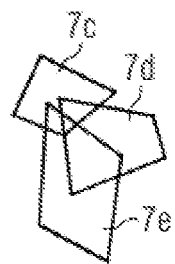
FIG. 6 shows an exemplary user input in accordance with the invention.

The monitoring apparatus 3 cannot directly monitor the concave working area 4 that results from the polytopes 7c, 7d, 7c of FIG. 6, because it is concave. The monitoring apparatus 3 therefore autonomously performs yet more method steps S2, S3, in order to correctly model the working area 3 and to allow the monitoring.

Figure 7:
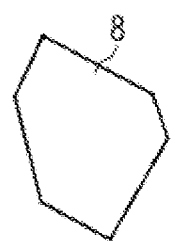
FIG. 7 shows an exemplary determined polytope hull in accordance with the invention.

In step S2 of FIG. 5, the hull determination unit 12 of the monitoring apparatus 3 determines a convex polytope hull 8. The polytope hull 8 determined for the polytopes 7c, 7d, 7e is illustrated in FIG. 7. The convex polytope hull 8 completely encloses the convex polytopes 7c, 7d, 7e. This means that the convex polytope hull 8 is determined by the monitoring apparatus 3 such that it encloses the three polytopes 7c, 7d, 7e and, is at the same time, convex.

In order to determine the polytope hull 8, the hull determination unit 12 applies the algorithm that is described in the article "Optimal output-sensitive convex hull algorithm in two and three dimensions" (T. M. Chan et al., Discrete and Computational Geometry, 16, 1996, pages 361-368).

In step S3 of FIG. 5, the protected area determination unit 13 of the monitoring apparatus 3 determines the at least one protected area 5g, 5h, 5i by calculating a difference from the determined convex polytope hull 8 and the user input.

FIG. 8 shows the protected areas 5g, 5h, 5i thus determined. The protected areas 5g, 5h, 5i and the convex polytopes 7c, 7d, 7e of the input (FIG. 6) together form the polytope hull 8.

In order to calculate the difference and determine the protected areas, the protected area determination unit 13 applies the algorithm from the article "Boolean Operations on Arbitrary Polyhedral Meshes" (Sâm Landier, Computer-Aided Design, Elsevier, 2016, pages 1-35, 10.1016/j.cad.2016.07.013, hal-01394537).

By virtue of determining both the polytope hull 8 and the protected areas 7c, 7d, 7e, complete autonomous characterization or modeling of the working area 4 in accordance with the mathematically correct model from FIG. 3 is made possible.

Based on the determined model of the working area 4, the monitoring apparatus 3 can easily and reliably monitor whether the robot 2 remains in the working area 4. This monitoring of the position of the robot 2 may be performed, for example, in accordance with the method from FIG. 9. Method steps S1-S3 from FIG. 9 correspond to method steps S1-S3 already described based on FIG. 5, and are therefore not described again.

In step S4 of FIG. 9, the monitoring apparatus 3 determines, for example, using a monitoring unit (not illustrated) whether the robot 2 is located completely within the polytope hull 8. To this end, the monitoring apparatus 3 monitors the robot 2 using a camera, not illustrated.

If it is determined in step S4 that the robot 2 is not completely within the polytope hull 8, step S5 is performed, in which a first safety measure is taken. Here, the first safety measure is deactivating the robot 2 to prevent it from injuring a user 6.

If it is determined in step S4 that the robot 2 is completely within the polytope hull 8, then step S6 is performed. In step S6 of FIG. 9, the monitoring apparatus 3 determines, for example, using the monitoring unit (not illustrated), whether the robot 2 is located at least partly within a protected area 5g, 5h, 5i. To this end, the monitoring apparatus 3 monitors the robot 2 using the camera (not illustrated).

If it is determined in step S6 that the robot 2 is at least partly within one of the protected areas 5g, 5h, 5i, then step S7 is performed, in which a second safety measure is taken. Here, the second safety measure is a deactivation of the robot 2 to prevent it from injuring a user 6.

If it is determined in step S6 that the robot 2 is not partly in a protected area 5g, 5h, 5i, then steps S8 and S9 are performed. In step S8 of FIG. 9, the monitoring apparatus 3 determines, for example, using the monitoring unit (not illustrated), whether the robot 2 is located at least partly within the monitoring region 7c. To this end, the monitoring apparatus 3 monitors the robot 2 using the camera (not illustrated).

In step S9 of FIG. 9, the monitoring apparatus 3 determines, for example, using the monitoring unit (not illustrated), whether an external device (not illustrated) or a user 6 is located at least partly within the monitoring region 7c. To this end, the monitoring apparatus 3 monitors the robot 2 using the camera, not illustrated.

If it is determined in step S8 and S9 that the robot 2 is at least partly within the monitoring region 9 and that the external device and/or the user are/is also at least partly in the monitoring region 9, then step S10 is performed, in which a third safety measure is taken. Here, the third safety measure involves deactivating the robot 2 to prevent it from injuring a user 6.

Steps S4, S6, S8 and S9 may be performed repeatedly in order to thus allow reliable monitoring of the robot position.

In the case of a change in the working environment 1, the user 6 may perform a new input into the monitoring apparatus 3. In this case, steps S1-S10 are performed again.

Although the present invention has been described on the basis of exemplary embodiments, it is able to be modified in many ways. Steps S4, S6, S8 and S9 may also be performed in another order or at the same time. The number of convex polytopes 7c-7e of the user input may vary, as may their shapes and arrangements with respect to one another. The algorithms used to determine the polytope hull 8 and the protected areas 5g-5i may also differ from the described algorithms, as long as they meet the same purpose. The movable device 2 may also be designed as a vehicle or the like. One and the same working area 4 may also contain a plurality of movable devices 2 that do not leave the working area 4 during normal operation.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a working environment of a movable device utilizing a monitoring apparatus, the working environment comprising a working area and at least one protected area, and the movable device being located within the working area during normal operation of said movable device, the method comprising:
    inputting a plurality of convex polytopes into the monitoring apparatus, the plurality of convex polytopes corresponding to areas in which the movable device is located during normal operation;
    determining a convex polytope hull utilizing the monitoring apparatus, the convex polytope hull completely enclosing the plurality of convex polytopes such that a volume of the convex polytope hull is minimal;
    determining the at least one protected area by calculating a difference from the convex polytope hull and the input utilizing the monitoring apparatus; and
    monitoring the working environment during normal operation of said movable device utilizing the monitoring apparatus and implementing a safety measure based on a location of the movable device.

2. The method as claimed in claim 1, further comprising:
    determining whether the movable device is located completely within the determined polytope hull; and
    performing a first safety measure only if the movable device is not located completely within the determined polytope hull.

3. The method as claimed in claim 2, wherein the method furthermore comprises:
    determining whether the movable device is located at least partly within the at least one determined protected area; and
    performing a second safety measure only if the movable device is located at least partly within the at least one determined protected area.

4. The method as claimed in claim 3, wherein at least one convex polytope of the input plurality of convex polytopes corresponds to a transfer region which allows a transfer of manufactured products between within the working area and outside the working area.

5. The method as claimed in claim 4, further comprising:
    determining whether at least one of a user and an external device is intervening in the transfer region from outside the working area;
    determining whether the movable device is located at least partly within the transfer region; and
    performing a third safety measure if at least one of the user and an external device is intervening in the transfer region from outside the working area and the movable device is located at least partly within the transfer region.

6. The method as claimed in claim 5, wherein at least one of (i) the first, (ii) the second and (iii) the third safety measure comprises:
    at least one of: (i) deactivating the movable device, (ii) outputting a visual alarm and (iii) outputting an alarm sound.

7. The method as claimed in claim 1, wherein the method furthermore comprises:
    determining whether the movable device is located at least partly within the at least one determined protected area; and performing a second safety measure only if the movable device is located at least partly within the at least one determined protected area.

8. The method as claimed in claim 1, wherein the movable device comprises a robot in an industrial installation.

9. The method as claimed in claim 1, wherein the working area has a concave shape.

10. A monitoring apparatus for monitoring a working environment of a movable device, the working environment comprising a working area and at least one protected area, and the movable device being configured to be located in the working area during normal operation of said movable device, the monitoring apparatus comprising:
- an inputter for inputting a plurality of convex polytopes which correspond to areas in which the movable device is located during normal operation;
- a hull determiner for determining a convex polytope hull which completely encloses the plurality of convex polytopes; and
- a protected area determiner for determining the at least one protected area by calculating a difference from the convex polytope hull and the input;
- wherein the monitoring apparatus monitors the working environment during normal operation of said movable device and a safety measure is implemented based on a location of the movable device determined by the monitoring apparatus.

11. The monitoring apparatus as claimed in claim 10, wherein the monitoring apparatus is configured to:
- receive an input plurality of convex polytopes corresponding to areas in which the movable device is located during normal operation.

* * * * *